(12) United States Patent
Ishizuka (10) Patent No.: US 6,204,936 B1
(45) Date of Patent: *Mar. 20, 2001

(54) IMAGE READING APPARATUS HAVING A PARTITION MODULE BETWEEN AN IMAGE SENSOR MODULE AND A HEAT SOURCE

(75) Inventor: Haruo Ishizuka, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/677,357

(22) Filed: Jul. 5, 1996

Related U.S. Application Data (62) Division of application No. 08/277,139, filed on Jul. 19, 1994, which is a continuation of application No. 07/845,959, filed on Mar. 4, 1992, now abandoned.

(30) Foreign Application Priority Data

Mar. 5, 1991 (JP) ...................................................... 3-62352

(51) Int. Cl.[7] .............................. H04N 1/04; G03G 15/20
(52) U.S. Cl. ........................... 358/474; 358/482; 399/335
(58) Field of Search .................................... 358/400, 401, 358/406, 471, 474, 500, 501, 504, 482, 483; 399/320, 328, 351, 92, 335; 219/216; H04N 1/00, 1/04

(56) References Cited

U.S. PATENT DOCUMENTS

| | | | |
|---|---|---|---|
| 4,720,727 | * 1/1988 | Yoshida | 219/216 |
| 4,760,426 | * 7/1988 | Taniguchi et al. . | |
| 4,903,072 | * 2/1990 | Iwata . | |
| 4,996,566 | * 2/1991 | Morita et al. . | |
| 5,115,304 | * 5/1992 | Yoshikawa et al. | 358/500 |
| 5,144,366 | * 9/1992 | Sakamoto et al. . | |
| 5,512,975 | * 4/1996 | Kitsu et al. | 355/215 |
| 5,608,509 | * 3/1997 | Shirai et al. | 399/351 |
| 5,819,136 | * 10/1998 | Tomita et al. | 399/69 |

* cited by examiner

Primary Examiner—Madeleine Anh-Vinh Nguyen
(74) Attorney, Agent, or Firm—Fitzpatrick, Cella, Harper & Scinto (57) ABSTRACT

An image reading apparatus having a partition module between an image sensor module and a heat source (e.g., a laser-beam printer) includes a partition module disposed between the image sensor module and the heat source. The partition module has two walls with a gap therebetween for thermally insulating the image reading module from the heat source. Preferably, the partition module has an air intake port, and an air exhaust port, and a fan for circulating cooling air.

21 Claims, 8 Drawing Sheets

IMAGE READING APPARATUS HAVING A PARTITION MODULE BETWEEN AN IMAGE SENSOR MODULE AND A HEAT SOURCE

This application is a division of application Ser. No. 08/277,139 filed Jul. 19, 1994, which is a continuation of Application No. 07/845,959 filed on Mar. 4, 1992, now abandoned.

BACKGROUND OF THE INVENTION

1. Field of the Invention

The present invention relates to an image reading apparatus, and, more specifically, to the one which is preferred for use in a document reading device such as an image reader, a facsimile machine, a digital copying machine, or the like.

2. Related Background Art

An image reading apparatus is known in which both an image sensor module and a heat source are housed in the same unit with the image sensor module disposed in the vicinity of the heat source; for example, an image sensor module is stacked on top of a laser-beam printer working as a heat source. In some apparatuses which have such a construction, a partition module is employed to separate the image sensor module from the laser-beam printer as a heat source. In some of these apparatuses, a heat insulating material is used in the partition module so that no heat transfer takes place from the laser-beam printer to the image sensor module.

In the conventional apparatuses mentioned above, however, even if the heat insulating material is employed in the partition module, the partition module gradually rises in temperature and reaches its thermal saturation if the apparatus is continuously run for a long time; heat is likely to transfer to the image sensor module, thereby causing its temperature to rise. In the event of temperature rise in the image sensor module, image sensor elements or an illumination device suffer from variations in their performance, deterioration of image sensing reliability and thus picture quality, and in an extreme case, destruction of components which are susceptible to heat. This problem is getting even more serious today, because of the increased frequency of use of apparatuses, the compact design of apparatuses, the increased amount of heat generated due to high-speed capability design, worsening heat radiation environments, and the like.

SUMMARY OF THE INVENTION

The present invention has been developed with a view to solving the above-mentioned problem. It is an object of the present invention to provide an image reading apparatus which avoids the thermal saturation of a partition module and positively prevents heat given off by a heat source from transferring to an image sensor module.

Another object of the present invention is to provide an image reading apparatus which can reliable sense images for an extended period of time.

A further object of the present invention is to provide an image reading apparatus which serves low-cost and compact design purposes but still free from the above-mentioned problem.

DETAILED DESCRIPTION OF THE PREFERRED EMBODIMENTS

To achieve the above-mentioned objects, in an image reading apparatus in which an image sensor module and a heat source are housed in the same unit with the image sensor module disposed in the vicinity of the heat source, the image sensing apparatus according to the present invention comprises a partition module for separating the image sensor module from the heat source, and a gap in the partition module. Preferably, the image sensing apparatus according to the present invention further comprises means for cooling the gap.

Figure 1:
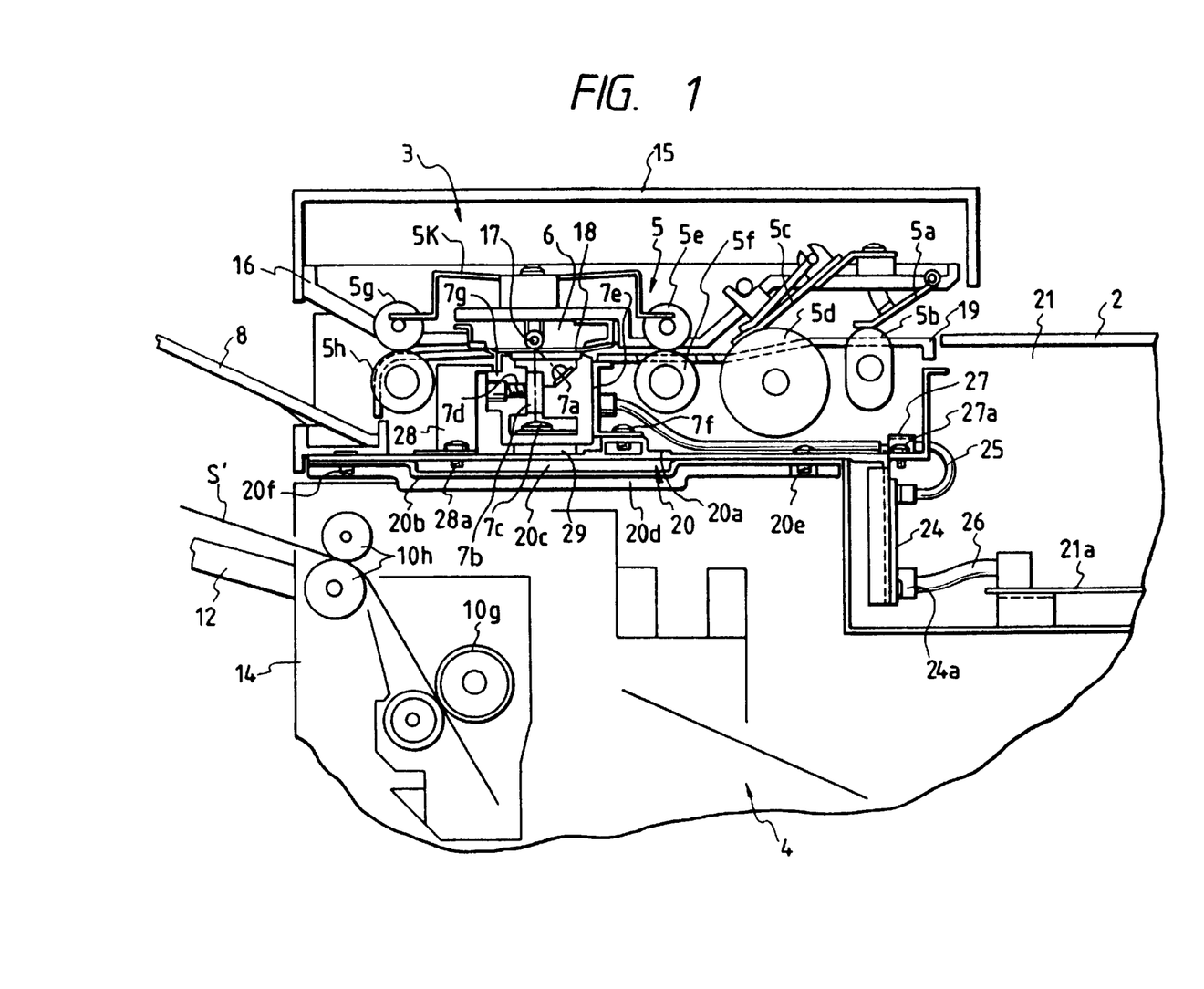
FIG. 1 is a vertical side cross-sectional view showing the major portion of a facsimile machine according to an embodiment of the present invention.
Figure 2:
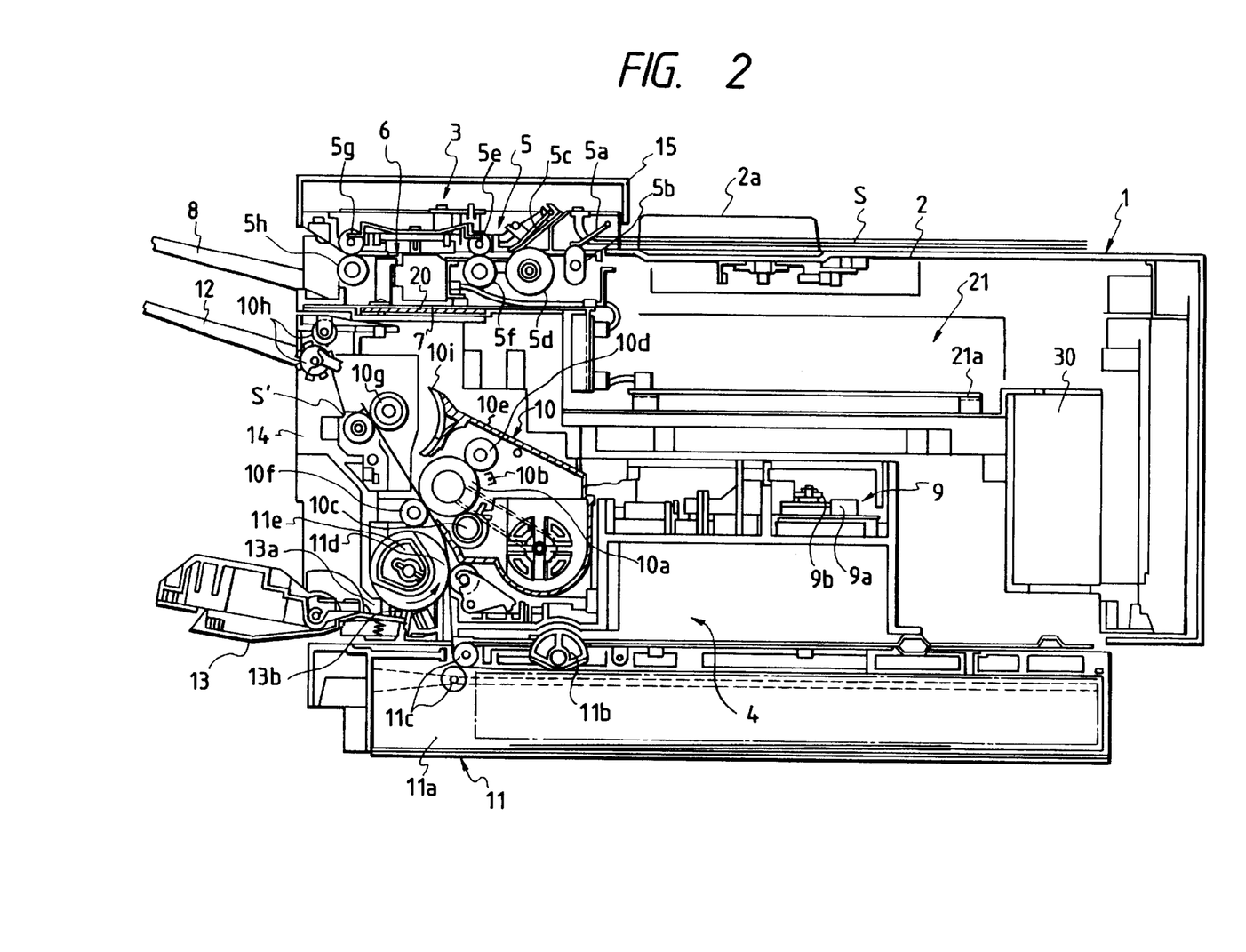
FIG. 2 is a general vertical side cross-sectional view showing the facsimile machine.
Figure 3:
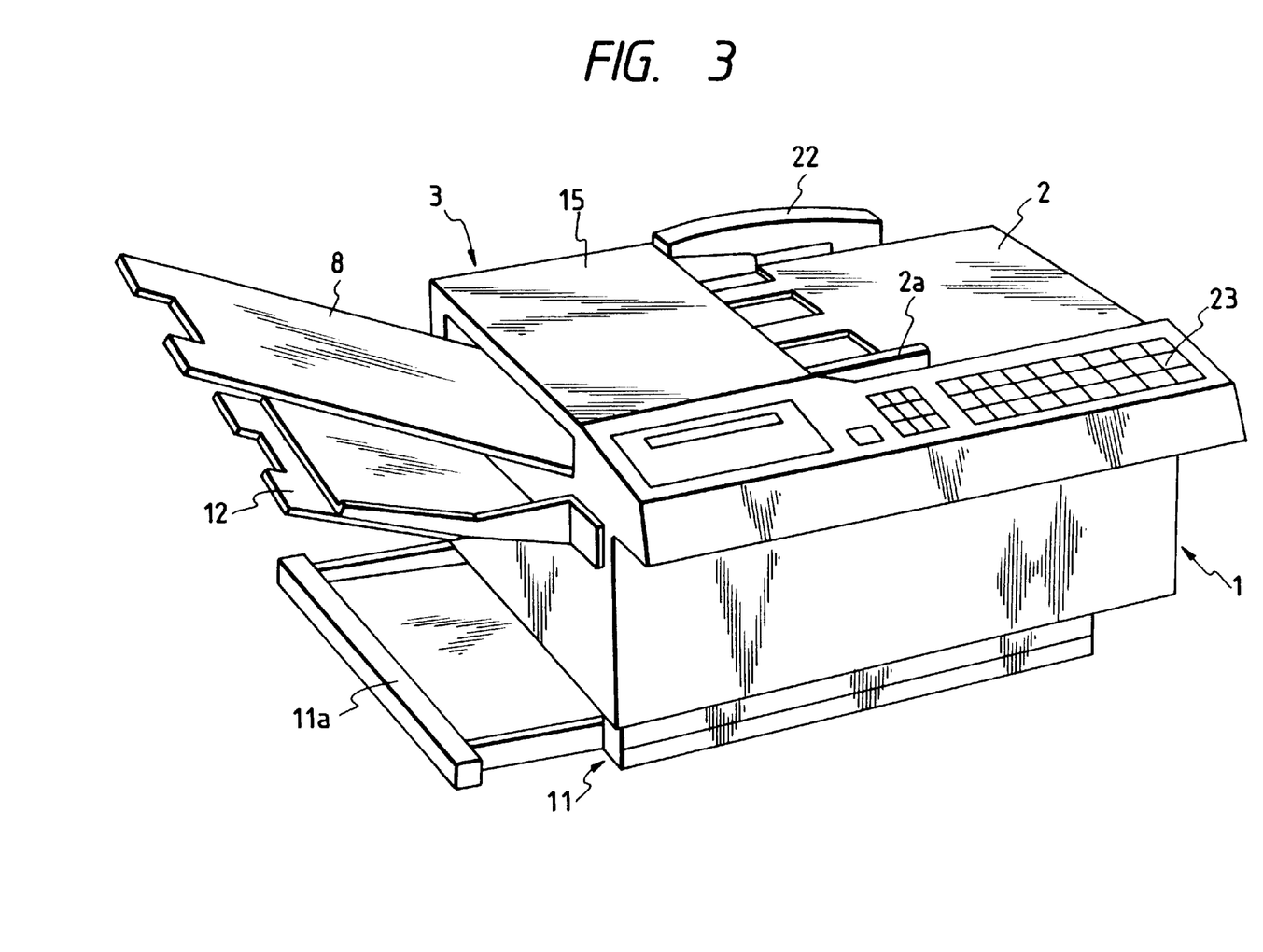
FIG. 3 is a general perspective view showing the facsimile machine.

Referring now to the drawings, the embodiments of the present invention are described below. Reference is first made to FIG. 1 through FIG. 3. Indicated at 1 is the main body of the facsimile machine. The top cover portion of the main body 1 is so designed that it can receive a plurality of original documents S from a document table 2. An image sensor module 3 housed in the apparatus main body 1 is equipped with a provision for sensing an image of the original documents S, and faces a recording module 4 made up of a laser-beam printer (a heat sources). Disposed in the image sensor module 3 are a document transport module 5, a document pressure module 6 and a contact-type image sensor 7. A document delivery tray 8 is disposed to the document delivery side of the document transport module 5. The recording module 4 comprises a laser scanner 9 and an image developing module 10, and a paper feeder cassette module 11 is mounted below them. The apparatus main body 1 further comprises a recording sheet delivery tray 12, a cut-sheet feeder tray 13, a openable cover 14, an ADF cover 15, an upper document guide 16, a weighted shaft 17, a document pressure plate 18, a lower document guide 19, a partition module 20 which is disposed between the image sensor module 3 and the recording module 4, a control module 21 for the facsimile machine, a handset 22, an operation panel 23, an image processing board 24, an interconnect cable 25 which connects the contact-type image sensor 7 to the image processing board 24, an interconnect cable 26 which connects the image processing board 24 to a main control board 21a, a cable clamp 27, a CS pressing bracket 28, and a silicone rubber sheet 29. Indicated at 30 is a power supply module.

In the image sensor module 3, original documents S on the document table 2 are picked up and separated, one by one, by means of a combination of a preliminary pressure blade 5a and a preliminary transport roller 5b which is pressed against the preliminary pressure blade 5a, and another combination of a separating pressure blade 5c and a separating roller 5d which is pressed against the separating pressure blade 5c. The original documents S are advanced to the image sensor 7 by means of a combination of a document feeder roller 5e pressed by a spring 5k and another document feeder roller 5f which is pressed against the document feeder roller 5e. The image sensor module 3 then senses images from the original documents S, keeping the original documents S in contact with the contact-type image sensor 7 by means of the weighted shaft 17 and the document pressure plate 18 in the document pressure module 6. The original documents S are sent out into the document delivery tray 8, by means of a combination of a delivery roller 5g pressed by the spring 5k and another delivery roller 5h which is pressed against the delivery roller 5g. Throughout the above travel, the original documents S are guided between the upper document guide 16 and the lower document guide 19.

The document table 2 has a slider 2a which can slide in the direction perpendicular to the direction of the document travel (i.e., along the width of the original documents S). The slider 2a allows the side edges of the original documents S placed on the document table 2 to be neatly aligned.

In the recording module 4, a modulated laser beam is emitted by a laser-beam oscillator 9a of the laser scanner 9 in response to an image signal provided by the control module 21. A polygonal mirror 9b directs the modulated beam to a photo-conductive drum 10a of the image developing module 10 in a manner that the photoconductive drum 10a is scanned by the modulated beam. An image thus develops on the surface of the photoconductive drum 10a. On the other hand, recording sheets S' are supplied to the image developing module 10 from the paper feeder cassette module 11 or the cut-sheet feeder tray 13. The image developed on the photo-conductive drum 10a is then transferred onto the recording sheets S'. After the image transfer operation, the image is then fixed on the recording sheets S'. The recording sheets S' are sent out into the recording sheet delivery tray 12.

The photoconductive drum 10a, along with a primary charger 10b, a developing roller 10c, and a cleaning roller 10d, is assembled into a recording cartridge 10e, and is detachable from the apparauts main body 1. When the surface of the photoconductive drum 10a which is uniformly charged by the primary charger 10b is scanned by the modulated laser beam by of the polygonal mirror 9b, an latent image is formed. The latent image becomes an visible image by means of toner supplied by the developing roller 10c.

A transfer charger 10f is disposed in the vicinity of the photoconductive drum 10a of the image developing module 10. Both a thermal fixing roller 10g and a delivery roller 10h are disposed in the downstream side of the recording sheet transportation path past the photoconductive drum 10a. The transfer charger 10f transfers a toner image formed on the surface of the photoconductive drum 10a to the recording sheets S'. The thermal fixing roller 10g fixes the toner image, and the recording sheets S' are then sent out into the recording sheet delivery tray 12 by the delivery roller 10h.

The cut-sheet feeder tray 13 is connected to the unit body 1 in a manner that it is openable down-wards. When the cut-sheet feeder tray 13 is opened down until it is almost horizontal, a cut-sheet feeder entrance 13a is opened. When the cut-sheet feeder tray 13 loaded with recording sheets S' is inserted into the entrance 13a, a pressure member 13b applies pressure onto the recording sheets S' against a transport roller 11e which is larger in diameter than another roller, both of which make a pair of transport rollers 11d. The recording sheets S' are then separated, one from another, by the transport roller 11e, to be transported into between the transfer charger 10f and the photoconductive drum 10a by the transport roller pair 11d.

Also mounted on the main body 1 is an openable cover 14 to which the cut-sheet feeder tray 13 is installed. The recording sheet delivery tray 12 is also mounted to the main body 1 in a manner that it is detachable. In the embodiment, the recording cartridge 10e can be pulled out of the apparatus main body 1 for replacement, by opening the operable cover 14.

The operable cover 14, in its opening and closing operations, is linked to a shutter 10i which is disposed, for the photoconductive drum 10a not to be exposed, on the recording cartridge 10e; when the cover 14 is opened, the shutter 10i is closed; and when the cover 14 is closed, the shutter 10i is opened.

In the paper feeder cassette module 11, a semicylindrical feeder roller 11b picks up and separates, one by one, recording sheets S' from a paper cassette feeder 11a which is mounted in a drawer fashion on the bottom portion of the apparatus main body 1. The recording sheets S are then transported between the transfer charger 10f and the photoconductive drum 10a, by means of a pair of cassette transport rollers 11c which function as a pair of timing rollers. The cassette roller pair 11c controls the paper feeding timing so that the forward edge of the toner image formed on the photoconductive drum 10a is accurately aligned with the forward edge of each recording sheet S'.

The partition module 20, which is particularly related to the core of the present invention, comprises a bottom plate 20a of the image sensor module 3, a top plate 20b of the recording module 4, an gap 20c formed between the bottom plate 20a and the top plate 20b, a heat insulating sheet 20d which is glued onto the top plate 20b of the recording module 4, and the like. Both the bottom plate 20a and the top plate 20b are made of steel coated with a high electric-conductivity material such as nickel, and the heat insulating sheet 20d is made of heat insulating material such as one known under designation "NOMEX" by DuPont. The image sensor module 3, which has a modular construction, is connected to the recording module 4 by image sensor module mounting screws 20e and 20f, in a detachable manner. The gap 20c is formed between the bottom plate 20a and the top late 20b as a result of connecting the image sensor module 3 to the recording module 4.

A contact-type image sensor 7 comprises a sensor frame 7g, onto which an LED array 7a as a light source, a SELFOC lens 7b, and sensor elements 7c are mounted. The SELFOC lens 7b is mounted by mounting screws 7d. In the course of mounting the SELFOC lens 7b by the mounting screws 7d, the image sensor 7 may suffer from warping if the sensor frame 7g is not mechanically strong enough. Preferably, the sensor frame 7g may be reinforced at mounting portion of the lens 7b employing reinforcing ribs. In the contact-type image sensor 7, furthermore, its frame 7g is connected, at one side, to a CS fixing plate 7e, which, in turn, is fixed onto the bottom plate 20a of the image sensor module 3 by CS fixing screws 7f.

In the contact-type image sensor 7, the LED array 7a projects light onto an image bearing side of original documents S, and the SELFOC lens 7b directs reflected light from the image bearing side to the sensor elements 7c for image forming. Image data picked up as above are transferred, as an image signal, via the interconnect cable 25, to the image processing board 24, in which signal processing, including shading correction and analog-to-digital conversion, are performed. After that, the image signal is sent to the main control board 21a via the interconnect cable 26.

The image processing board 24 is fixed to the bottom plate 20a of the image sensor module 3 by image processing board mounting screws 24a. The interconnect cable 25 is fixed onto the bottom plate 20a with the cable clamp 27 and its fixing screws 27a. The CS pressing bracket 28, which restricts the sensor frame 7g from its top edge, is secured onto the bottom plate 20a with CS pressing bracket screws 28a, so that the original documents S may not be jammed as a result of displacement of the contact-type image sensor 7 toward its document sensing surface.

The silicone rubber sheet 29 is disposed to the bottom portion of the contact-type image sensor 7; in the above embodiment, for example, the silicone rubber sheet 29 is sandwiched between the sensor frame 7g and the bottom plate 20a. The silicone rubber sheet 29 works by its own resiliency in a manner that the contact-type image sensor 7 is pressured toward its document sensing surface. Since the silicone rubber sheet 29 is disposed on the bottom portion of the contact-type image sensor 7 in the above embodiment, by simply gluing onto the upper side of the bottom plate 20a of the image sensor module 3, assembling efficiency is increased.

In the recording module 4, after a toner image formed on the surface of the photoconductive drum 10a is transferred to a recording sheet S', the toner image is fixed with the thermal fixing roller 10g. The thermal fixing roller 10g is thermally controlled to be kept at a constant temperature (180° C., for example), so that the toner image is fixed in a reliable manner. Commmonly employed for this thermal control are a heater to heat the thermal fixing roller 10g and a cooling fan. In such a configuration, the thermal fixing roller 10g kept at a high temperature considerably heats the inside of the recording module 4, as a result of effects of radiation, convection and conduction of heat. The image sensor module 3 which borders, from above, on the recording module 4 may be also heated and adversely affected.

Figure 4:
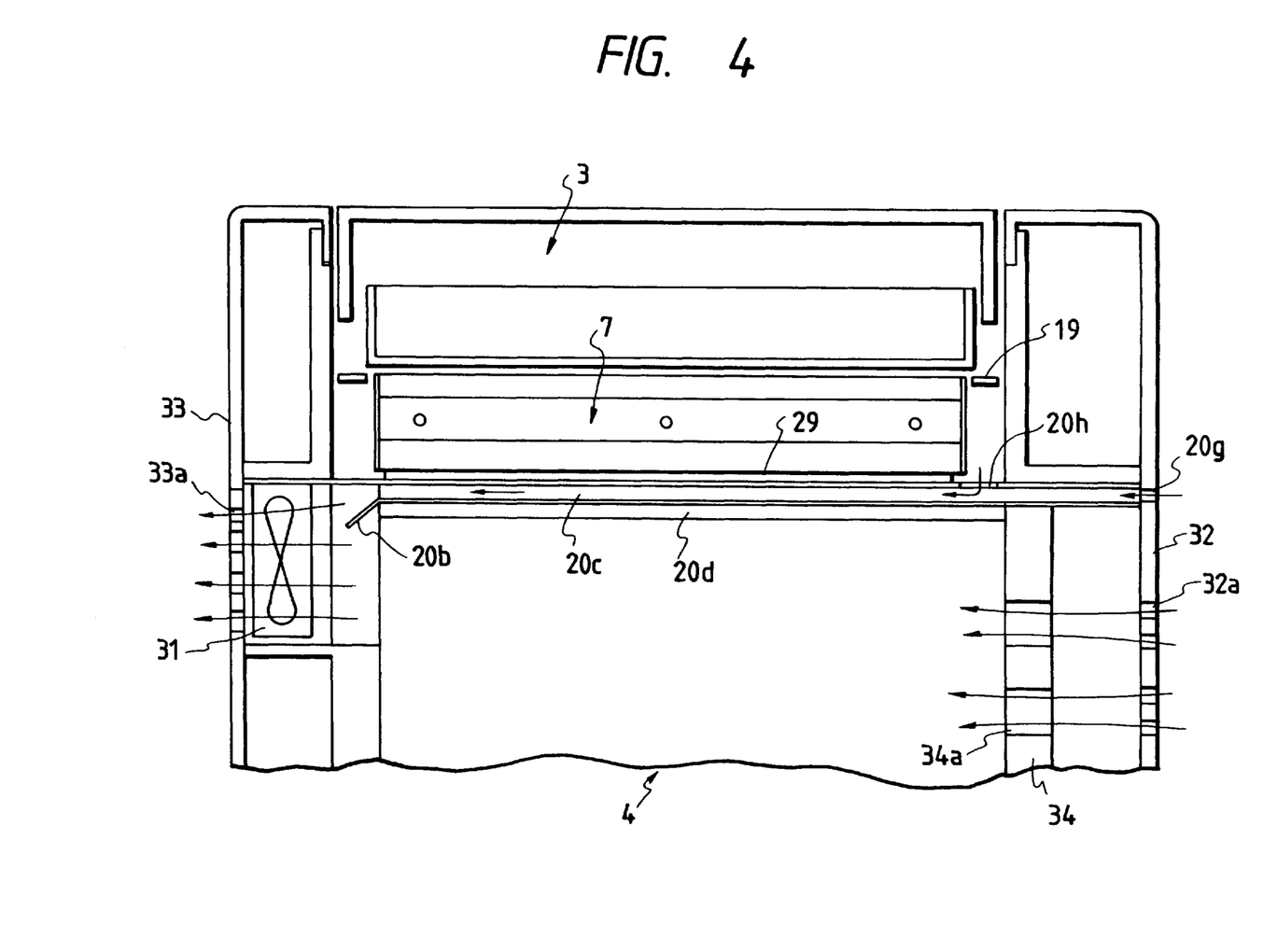
FIG. 4 is a fragmentary vertical cross-sectional view, taken along near a contact-type image sensor, showing an image sensor module.

According to the present invention, remedial steps are preferably taken as detailed in FIG. 4. To avoid a temperature rise in the image sensor module 3, enhancing the heat insulating capability of the partition module 20 disposed between the image sensor module 3 and the recording module 4. For the purpose of cooling the recording module 4, louvers (vent holes) 34a and 32a are provided respectively on the recording module 4 chassis 34 which encloses the recording module 4 and on the main body front cover 32 which faces the recording module 4 chassis 34. Also, louvers 33a are provided on the main body back cover 33. A cooling fan 31 for exhausting is air mounted on the recording module 4 chassis 34, correspondingly to the louvers 33a. Air taken in via air intakes 20h and 20g is circulated through the gap 20c provided in the partition module 20. Air circulated through the gap 20c is then exhausted using part of pressure driven by the cooling fan 31. Heat from the recording module 4 is exhausted to the outside as mentioned above, and the heat insulating capability of the partition module 20 is thus enhanced in a positive manner.

Both air intakes 20h and 20g may be used at the same time. Alternatively, either air intakes 20h or 20g may be used alone. The use of the air intakes 20h is advantageous in that the main body external appearance is free from such intakes, that the temperature of the image sensor module 3 is also lowered by circulating air from inside the image sensor module 3, and that, depending on the configuration of the bottom plate 20a, holes made for other purposes (such as machining reference holes or cut-away holes for sheet bending) serve the purpose of intakes without the need for machining intakes in particular. The use of air intakes 20g is advantageous in that external air which is usually relatively cooler than internal air can be taken in.

The reason air intakes are not provided on the recording module 4 is that circulating air which is already heated inside the recording module 4 reaches the gap 20c and causes the gap 20c to rise in temperature.

In the above embodiment, the cooling fan 31 pushes out air from inside the recording module 4. Alternatively, as in FIG. 5, the cooling fan 31 may push air into the recording module 4. In such an arrangement, the cooling fan 31 works in a manner that air is taken into the recording module 4 via louvers 33a. The air is then exhausted from the recording module 4 via louvers 32a and 34a. In this embodiment, the gap 20c is also formed in the partition module 20 to prevent a temperature rise in the image sensor module 3; part of the pressure driven by the cooling fan 31 is used to push out air from inside the gap 20c. This arrangement allows heat to be exhausted from the recording module 4, and the heat insulating capability of the partition module 20 is thus enhanced in a positive manner. In this embodiment, air is exhausted by both exhaust vents 20g and 20i. Both exhaust vents 20g and 20i may be used at the same time. Alternatively, either exhaust vents 20g or 20i used may be used alone. The use of the exhaust vent 20i is advantageous in that the main body external appearance is free from such exhaust vents. The use of the exhaust vent 20g is advantageous in that air exhausting through it is subjected to relatively less resistance.

Figure 5:
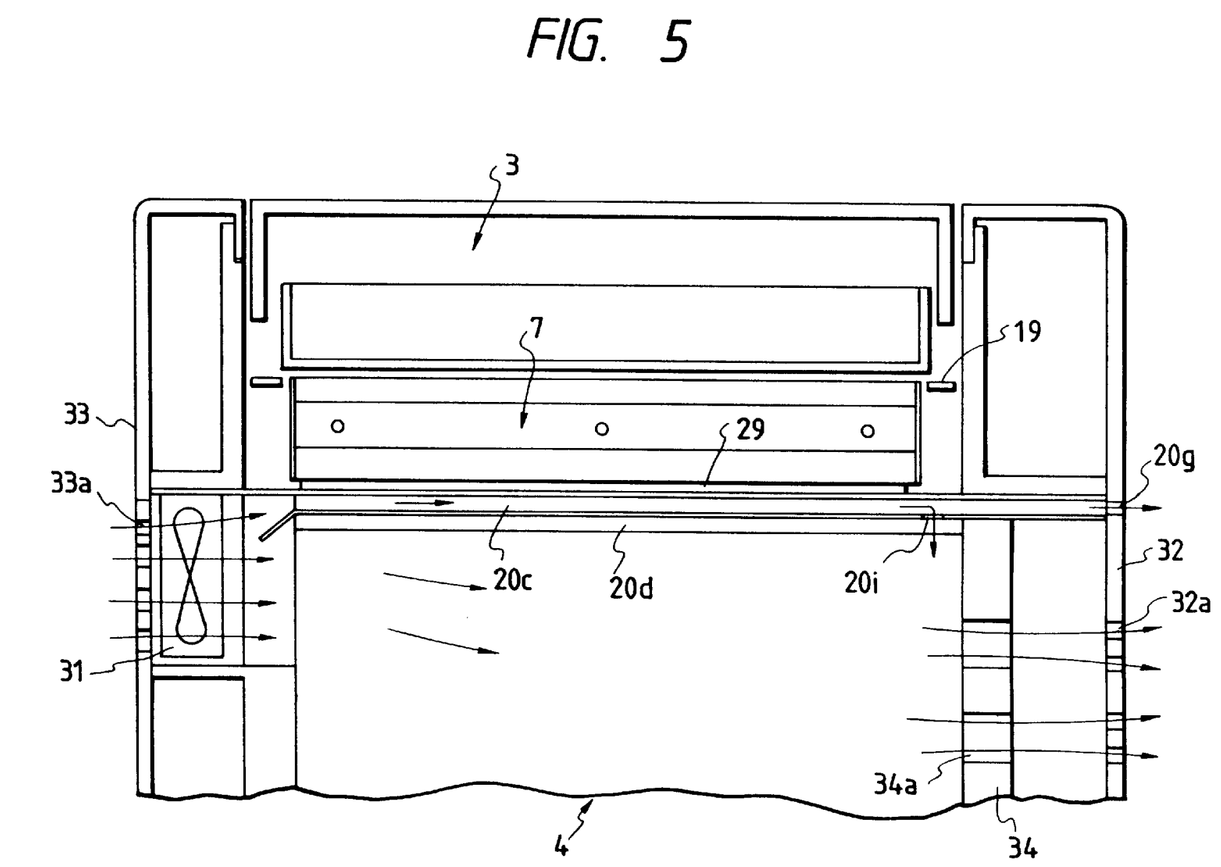
FIG. 5 is a fragmentary vertical cross-sectional view, taken along near the contact-type image sensor, showing another embodiment of the present invention.

The reason the exhaust vents are not provided on the image sensor module 3 is as follows: when air is circulated from inside the gap 20c into the image sensor module 3, airflow takes place inside, the original document S is pushed up by it, and consequently the image sensing operation is adversely affected.

Furthermore, in these embodiments, the heat insulating sheet 20d is glued onto the top plate 20b of the recording module 4, thereby restricting heat transfer from the recording module 4 to the gap 20c of the partition module 20. As a result, the heat insulating capability of the partition module 20 is enhanced even more, the thermal fixing roller 10g which is thermally controlled is not excessively cooled, and the quantity of heat used to heat the thermal fixing roller 10g is kept to a minimum.

Although the laser-beam printer is quoted as a heat source in the above embodiments, it may be alternatively a thermal printer or any other large capacity power supply. Also, the contact-type image sensor is employed in an image sensor module. Alternatively, an image pickup device of reduced size optical system comprising fluorescent lights, mirrors, lens, and CCD may be used.

Figure 6:
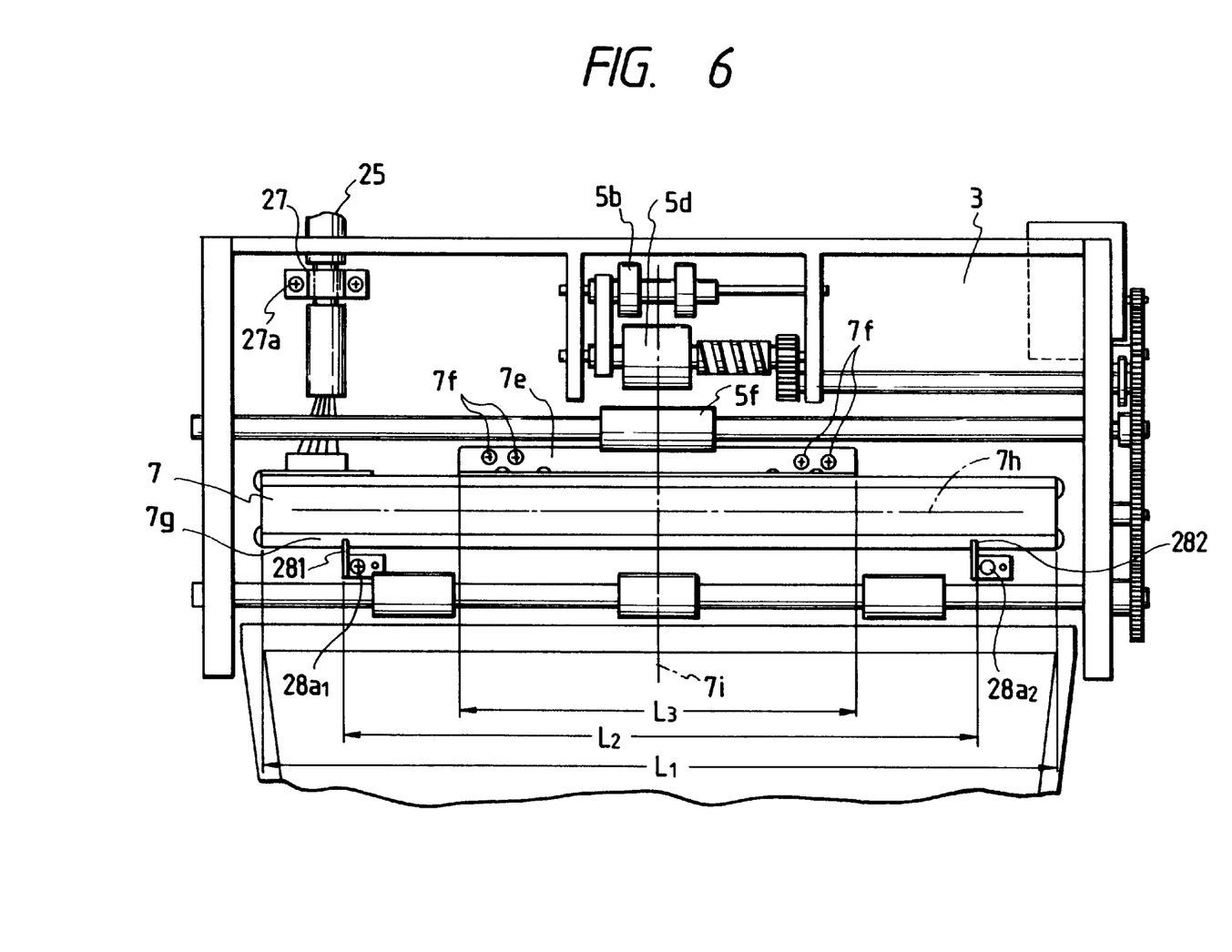
FIG. 6 is a fragmentary transverse cross-sectional view, taken along near an image sensor module, showing another embodiment.

In another embodiment illustrated in FIG. 6, the CS pressing bracket 28 and its fixing screws 28a are replaced with a pair of CS pressing brackets 281 and 282, and their respective fixing screws 28a1 and 28a2. The use of the CS pressing bracket pair restricts the inclination of the contact-type image sensor 7. In this arrangement, both positions where CS pressing brackets 281 and 282 support the sensor frame 7g of the contact-type image sensor 7 are located in a substantially symmetrical manner with respect to the center line 7i of the width L1 of the main scanning line 7h in the contact-type image sensor 7. This minimizes variations in the inclination of the image sensing surface of the contact-type image sensor 7 at its right hand side or left hand side. By setting the separation L2 between the CS pressing brackets 281 and 282 fixed as above to be greater than about one-third the width L1 of the main scannning line 7h and also greater than the width L3 of the CS fixing plate 7e, the inclination of the image sensing surface of the contact-type image sensor 7 is effectively restricted. When the sensor frame 7g of the contact-type image sensor 7 is extruded at its manufacturing stage, reinforcement ribs are, at the same time, provided to each supporting position corresponding to both CS pressing brackets. Since the CS pressing brackets 281 and 282 meet the rib portions when assembled, their parallelism to the image sensing surface remains accurate. Thus, both brackets installed as above work as an effective reference when controlling the inclination of the image sensing surface.

The positions where the CS pressing brackets 281 and 282 meet the reinforcement ribs may be set symmetrically, by arranging the mounting positions of the CS pressing bracket screws 28a1 and 28a2 in a asymmetrical manner on opposite sides of the center line 7i of the width L1 of the main scanning line 7h as in FIG. 6. Such an arrangement eliminates the need for different designs of CS pressing bracket 281 and 282; thus, brackets having an identical design can be commonly used on opposite sides of the center line 7i; lowering manufacturing costs, and, minimizing variations in the inclination of the image sensing surface. Although the CS pressing brackets are made of steel in the above embodiments, other materials, for example, plastic material, may be substituted as long as they serve the above mentioned purpose. Although the CS pressing brackets are fixed by screws in the above embodiments, they may be fixed using other means, such as glue. The CS pressing brackets may be formed as an integral part of the image sensing module, if such an arrangement presents no difficulty in mounting the contact-type image sensor. The CS fixing plate 7e is mounted on the incoming side of the original document, and the CS pressing brackets are mounted on the outgoing side of the original document. This arrangement may be reversed: the CS fixing plate 7e on the outgoing side and the CS pressing brackets on the incoming side of the original document.

In the above embodiments, the silicone rubber sheet is employed to press the contact-type image sensor against the CS pressing brackets. Alternatively, springs or other means may be employed.

The frame 7g of the contact-type image sensor 7 is made, for example, by extruding an aluminum alloy. After the extruded frame is machined to its final configuration with required machining added, the frame is alumite processed. Components with which this frame 7g is associated, such as the CS fixing plate 7e, the CS fixing screws 7f, the CS fixing plate screws 7h all made of steel, are coated with a high-conductivity material like nickel, tin, or aluminum, as appropriate.

Figure 7A:
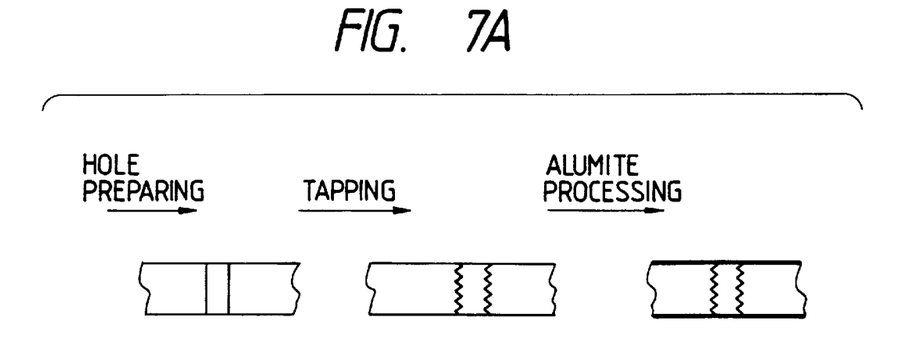
FIG. 7A illustrates the sequential steps of an alumite processing and tapping.
Figure 7B:
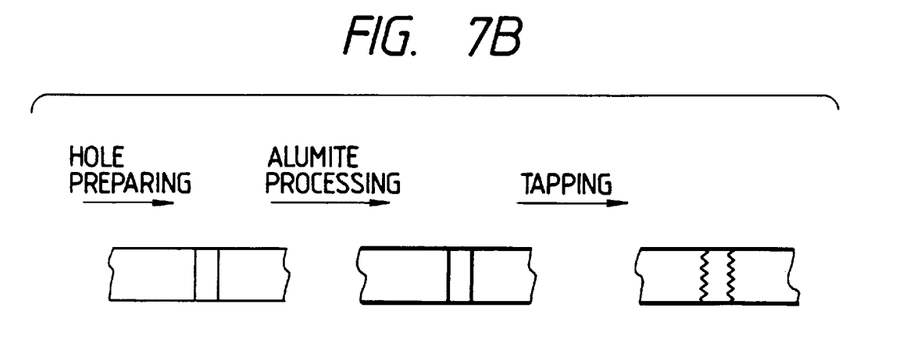
FIG. 7B illustrates the sequential steps of an alumite processing and tapping, according to the present invention.

As already described, all the surfaces of the CS fixing plate 7e, the CS fixing screws 7f, the CS fixing plate screws 7h, the bottom plate 20a, the top plate 20b, the image sensor module mounting screws 20e and 20f are conductive. Since the frame 7g is tapped before aluminate processing as illustrated in FIG. 7(A), no conductivity is assured when the frame 7g has screws mounted as alumite processing may coat the tapped holes. If, as shown in FIG. 7B the alumite processing is performed to the frame 7g after holes are prepared, and tapping is then performed to the frame 7g, tapped holes remain conductive. Alumite coating thereon is removed by tapping. Thus, conductivity is assured when the frame 7g has screws mounted.

The bottom plate 20a and the top plate 20b are electrically in contact with each other, at points where the image sensor mounting screws 20e and 20f are screwed in; thus, the frame 7g of the contact-type image sensor 7 has the same ground potential as that of the apparatus main body 1.

Figure 8:
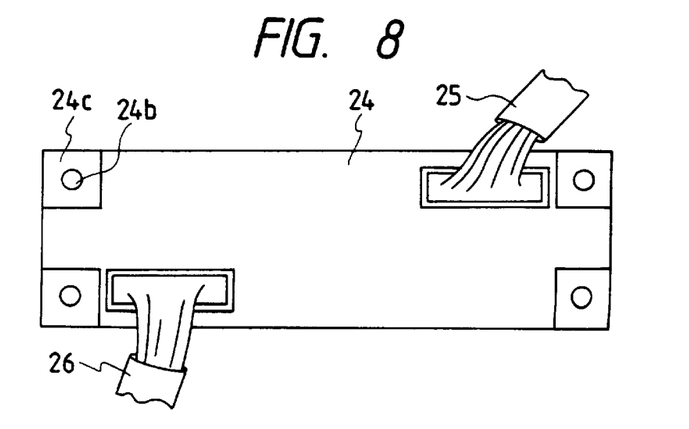
FIG. 8 shows interconnect cables of an image processing board.

Described below is the grounding of the image processing board 24. The image processing board 24 has mounting holes 24b and ground land patterns 24c as shown in FIG. 8. The ground land patterns 24c are formed by leaving image processing board ground land patterns 24 exposed without a resist coating and then applying solder coating on the ground land patterns 24 to avoid their oxidation. These patterns are secured to the bottom plate 20a by the image processing board mounting screws 24a; thus, the ground of the image processing board 24 is electrically connected to the bottom plate 20a via the mounting screws 24a. Alternatively, on the opposite side of the ground land patterns 24c, ground lands may be patterned, which may be directly connected to the bottom plate 20a for electrical connection.

Figure 9A:
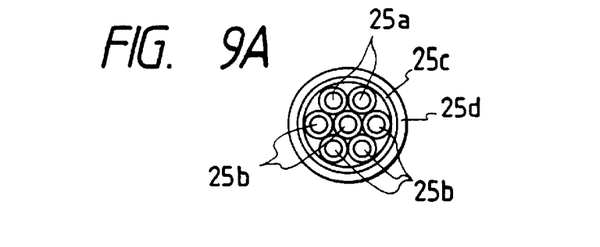
FIG. 9A is a cross-sectional view of the interconnect cable.
Figure 9B:
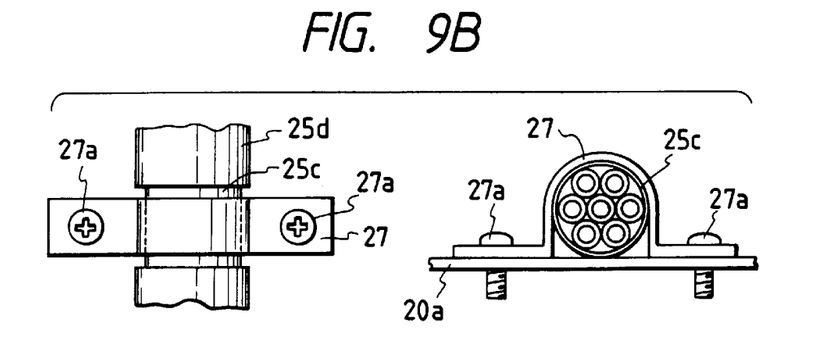
FIG. 9B includes a plan view and a cross-sectional view, each showing how the interconnect cable is fastened.

The interconnect cable 25 is now described, referring to FIG. 9A and FIG. 9B. In FIG. 9A, image signal lines are indicated at 25a. Indicated at 25b are control signal lines for the contact-type image sensor, supply lines for the LED array 7a and other lines. Each of the image signal lines 25a and remaining lines 25b has a core with insulation covering. All the lines, as a whole, are covered with overall braided shield 25c, and then finished with an overall covering tube 25d. The interconnect cable 25 is processed, as shown in FIG. 9B, with its covering 25d removed and its shielding exposed, at its portion where the cable clamp 27 is mounted; when the cable clamp screws 27a are driven to secure the interconnect cable 25 along with the cable clamp 27 to the bottom plate 20a, the shield 25c is electrically connected to the bottom plate 20a.

Figure 9C:
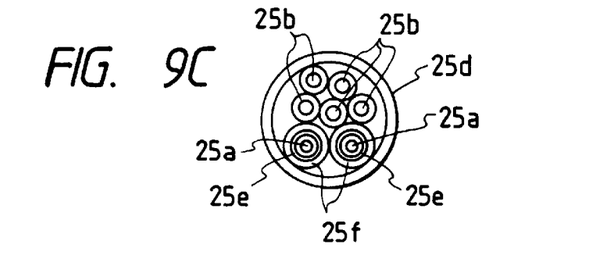
FIG. 9C is a cross-sectional view of the interconnect cable, according to another embodiment of the present invention.
Figure 9D:
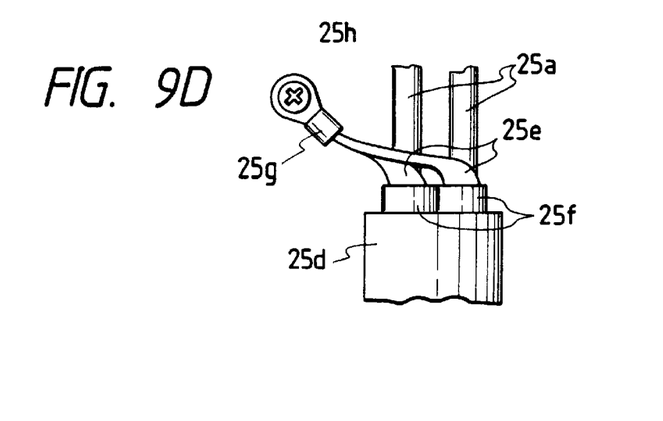
FIG. 9D is a cross-sectional view showing how the interconnect cable is fastened.

A second embodiment of the interconnect cable 25 is illustrated in both FIG. 9C and FIG. 9D. Image signal lines are 25a. Indicated at 25b are control signal lines for the contact-type image sensor, supply lines for the LED array 7a and other lines. Each of the image signal lines 25a and remaining lines 25b has a core with insulation covering. Each of the image signal lines has further a braided shield 25e and then covering 25f, instead of the overall shield 25c mentioned above. All the lines are then finished with an overall covering tube 25d. As shown in FIG. 9D, the interconnect cable 25 is terminated, with its overall covering 25d and the inside covering 25f removed to expose each of the shields 25e. The shields 25e are connected together to a lug 25g, which, in turn, connected to the bottom plate 20a by a lug screw 25h. The shields 25e are thus electrically connected to the bottom plate 20a. One lug 25g may be used for each of the shields 25e for connection, instead of one lug 25g for all the shields 25e.

In the above embodiments, the screws employed are made of steel, and plates are steel ones which have a conductive coating finish. Other material may also be employed for the above components as long as their surfaces are conductive. For example, stainless steel, copper, or other metals, or a mixture made of plastic materials mixed with copper power or carbon powder to provide conductivity, may be used. Non-conducting plastic materials having a conductive coating such as nickel coating may also be employed. The material of the sensor frame is not limited to the aluminum alloy. Other materials may also be employed as a material for the sensor frame, as long as it is conductive. Further to the lines for the image signal transmission in the interconnect cable, each of the remaining lines may also be separately shielded. It is not necessary to unite all the lines as a single cable by a common overall covering.

As mentioned above, in the image sensing apparatus in which the image sensor module and the heat source are housed in the same unit with the image sensor module disposed in the vicinity of the heat source, the present invention, by providing the partition module for isolating the image sensor module from the heat source, by providing the gap inside the partition module, and by providing means for cooling the gap, avoids the thermal saturation of the partition module, and positively prevents heat generated by a heat source from transferring to the image sensor module. As a result, temperature variations in the image sensor module are minimized, variations in performance of the image sensor elements and the illumination device are minimized, and, thus, sensing reliability is enhanced. Since the image sensor module is of modular construction, the partition module having the gap inside it is formed when both the sensor module and the heat source are assembled, without the need for any particular components for the gap.

What is claimed is:

1. An image forming apparatus comprising:
   an electrophotographic recorder comprising a photosensitive drum, a charger for charging said photosensitive drum, an exposer, arranged to irradiate said photosensitive drum with light carrying image information, a developer, arranged to form a visible image on said photosensitive drum, an image transferor, arranged to transfer the visible image onto a member to be recorded, and a fixer, having a heat source arranged to fix a transferred image onto the member to be recorded;
   an image reader, arranged adjacent to said heat source, including an image reading module comprising an image sensor for photoelectrically converting image information of an original document to an electric signal, said heat source and said image reading module being isolated from each other by a partition having at least two walls with a gap therebetween for thermally insulating said image reading module from said heat source, one of said at least two walls being arranged on the side of said image reader, another of said at least two walls being arranged on the side of said electrophotographic recorder, at least one of said at least two walls having an opening for bringing air inside the gap in communication with air outside the gap; and
   a cooler, arranged to push air out of, or suck air into, the gap, to forcibly exchange the air inside the gap.

2. An image forming apparatus as recited in claim 1, further comprising a heat insulating layer disposed on the heat source side of said partition.

3. An image forming apparatus according to claim 2, wherein said cooler comprises a fan.

4. An image forming apparatus according to claim 2, wherein said image reading module comprises a contact type image sensor disposed on a substrate comprising a conductive material.

5. An image forming apparatus according to claim 2, wherein said cooler comprises a structure for forcibly exhausting air inside the gap of said partition.

6. An image forming apparatus according to claim 5, wherein said partition comprises an air inlet port and an air exhaust port.

7. An image forming apparatus according to claim 6, wherein said cooler comprises a fan for forcibly exchanging air inside the gap, said fan is disposed adjacent said image reading module, and an air exhaust portion is disposed at a side of said partition opposite said image reading module.

8. An image forming apparatus according to claim 7, wherein said air exhaust port is disposed adjacent said heat source.

9. An image forming apparatus according to claim 6, wherein said image reading module comprises a contact type image sensor disposed on a substrate comprising a conductive material.

10. An image forming apparatus according to claim 6, wherein said cooler comprises a fan.

11. An image forming apparatus according to claim 6, wherein said air inlet port is disposed adjacent said image reading module.

12. An image forming apparatus according to claim 1, wherein said apparatus is an electro-photographic recording apparatus.

13. An image forming apparatus according to claim 1, wherein said exposer comprises a laser beam oscillator.

14. An image forming apparatus as recited in claim 1, wherein said cooler is provided for cooling the gap.

15. An apparatus according to claim 14, wherein said cooler comprises a fan.

16. An image forming apparatus as recited in claim 1, wherein said partition comprises an air inlet port and an air exhaust port.

17. An image forming apparatus according to claim 16, wherein said cooler comprises a fan for forcibly exchanging air inside the gap, the fan is disposed adjacent said image reading module, and said partition module comprises an air inlet port and an air exhaust port, the air inlet port is disposed adjacent to said image reading module, and the air exhaust port is disposed adjacent said image reading module.

18. An image forming apparatus as recited in claim 1, wherein said cooler also cools said heat source.

19. An image forming apparatus as recited in claim 1, wherein said image reading module comprises a contact-type image sensor disposed on a substrate comprising a conductive material.

20. An image forming apparatus as recited in claim 1,
   wherein said cooler comprises a fan for forcibly exchanging the air inside the gap, the fan is disposed adjacent to said image reading module, and an air exhaust portion is disposed on a side of said partition opposite said image reading module.

21. An image forming apparatus according to claim 20, wherein said air exhaust portion is adjacent said heat source on the side of said partition.

* * * * *